United States Patent [19]

Ireland et al.

[11] Patent Number: 4,611,777
[45] Date of Patent: Sep. 16, 1986

[54] COMPUTER TERMINAL STAND

[75] Inventors: Thomas M. Ireland; Thomas J. Koller, both of West Linn; Michael T. Lancaster, Beaverton, all of Oreg.

[73] Assignee: Tektronix, Inc., Beaverton, Oreg.

[21] Appl. No.: 662,607

[22] PCT Filed: Oct. 11, 1983

[86] PCT No.: PCT/US83/01589
§ 371 Date: Oct. 15, 1984
§ 102(e) Date: Oct. 15, 1984

[87] PCT Pub. No.: WO85/01648
PCT Pub. Date: Apr. 25, 1985

[51] Int. Cl.$^4$ ............................................. B60N 1/02
[52] U.S. Cl. .................................. 248/371; 248/162.1
[58] Field of Search .................... 248/371, 161, 162.1, 248/415, 418, 157, 425, 177, 188.5, 346, 349, 183, 631, 562, 658, 129, 144

[56] References Cited

U.S. PATENT DOCUMENTS

| | | | |
|---|---|---|---|
| 2,248,369 | 7/1941 | Ludersen | 248/371 |
| 2,935,288 | 5/1960 | Summerer | 248/349 |
| 3,455,531 | 7/1969 | Baker | 248/349 |
| 3,479,632 | 11/1969 | Galles | 248/349 X |
| 3,888,442 | 6/1975 | Comeaux | 248/129 X |
| 3,897,833 | 8/1975 | Frisbee | 248/183 X |
| 4,095,770 | 6/1978 | Long | 248/371 |
| 4,117,627 | 10/1978 | Slingerland | 248/349 X |
| 4,305,563 | 12/1981 | Presson | 248/349 |
| 4,395,010 | 7/1983 | Helgeland et al. | 248/371 |

FOREIGN PATENT DOCUMENTS 0803930  4/1951  Fed. Rep. of Germany ...... 248/371

Primary Examiner—Ramon O. Ramirez
Attorney, Agent, or Firm—James Campbell; John Smith-Hill; Robert S. Hulse

[57] ABSTRACT

A stand for a computer display terminal is described which enables the terminal to be tilted in a vertical direction, swiveled in a horizontal plane and adjusted in height. The height adjustment is accomplished by a pair of telescoping posts attached between a swivel base member and tilt carriage arms on opposite sides of the computer terminal. A gas cylinder is provided to counterbalance the weight of the terminal and is connected to the telescoping posts by flexible connectors, such as metal cables. As a result, the user adjusts the height by merely overcoming the friction of the telescoping posts the pulley system and the gas spring since the weight of the computer terminal is counterbalanced by the gas cylinder. A releasable brake is provided on the base member which also includes a glide means for enabling gliding movement of the stand over a support surface only when the brake means is released. The brake includes a brake pad which engages the support surface at a position under the swivel axis of the base member so that the stand can swivel about such axis when the brake means is engaged.

18 Claims, 7 Drawing Figures

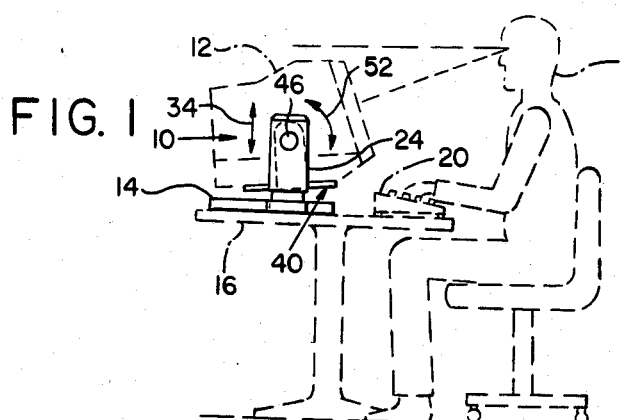
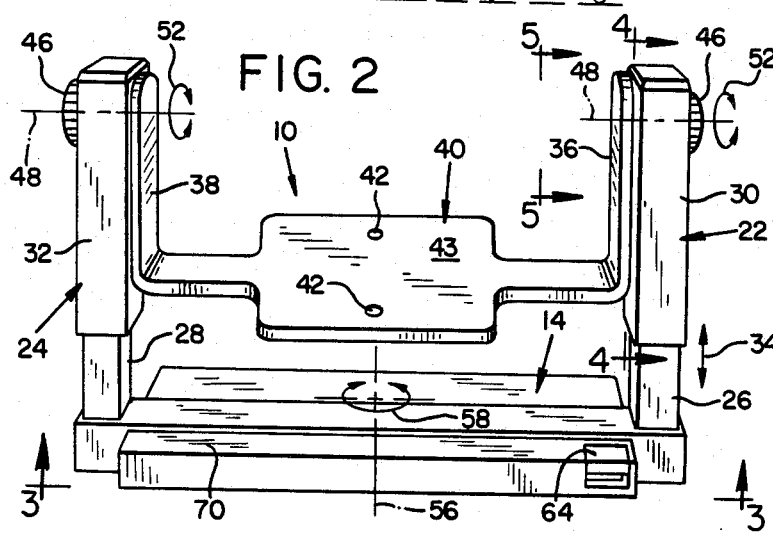
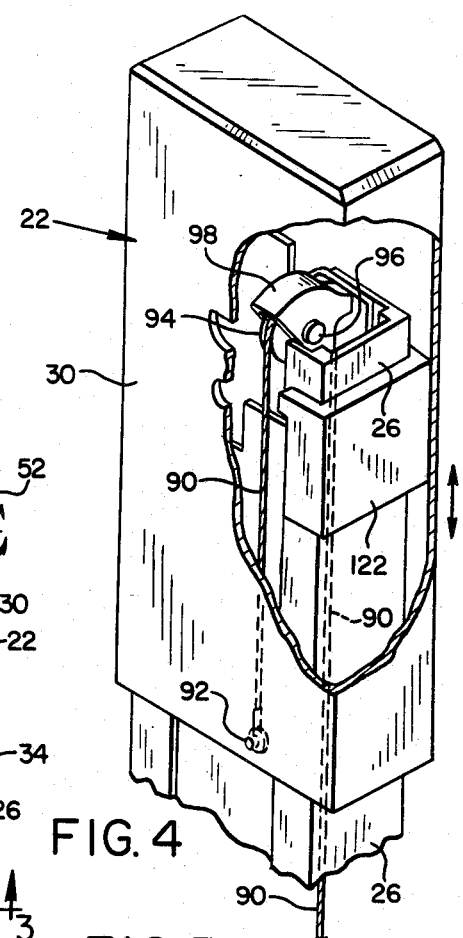
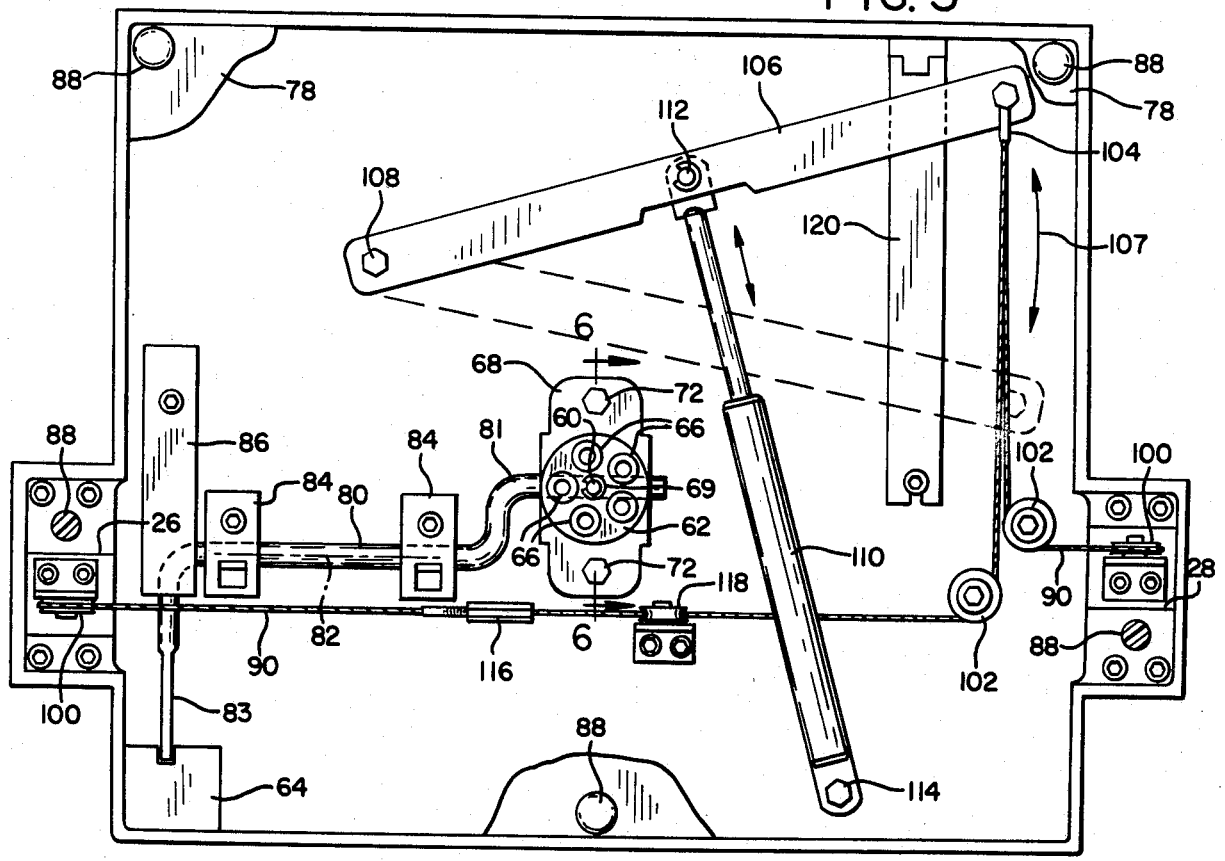

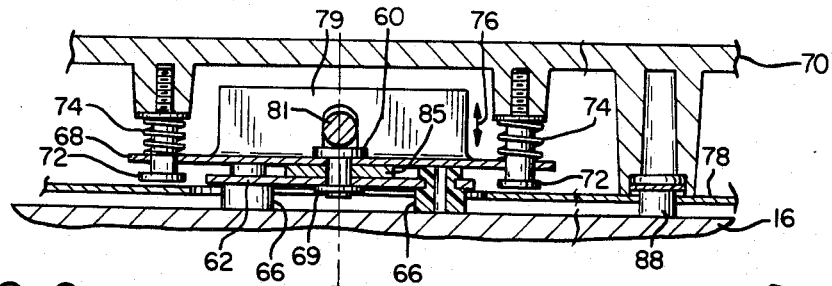
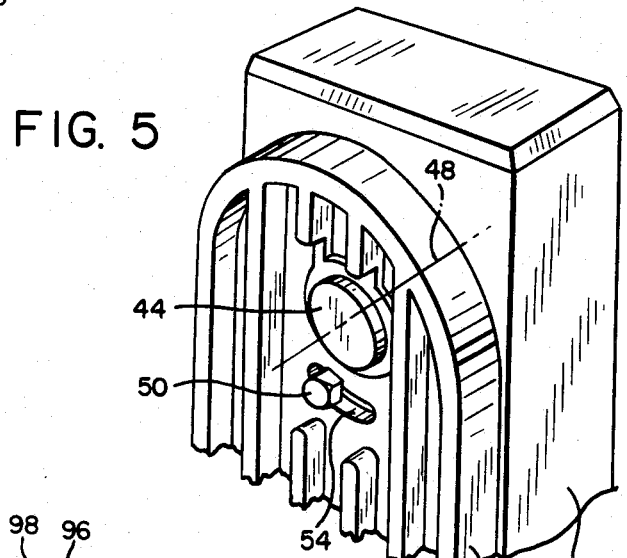
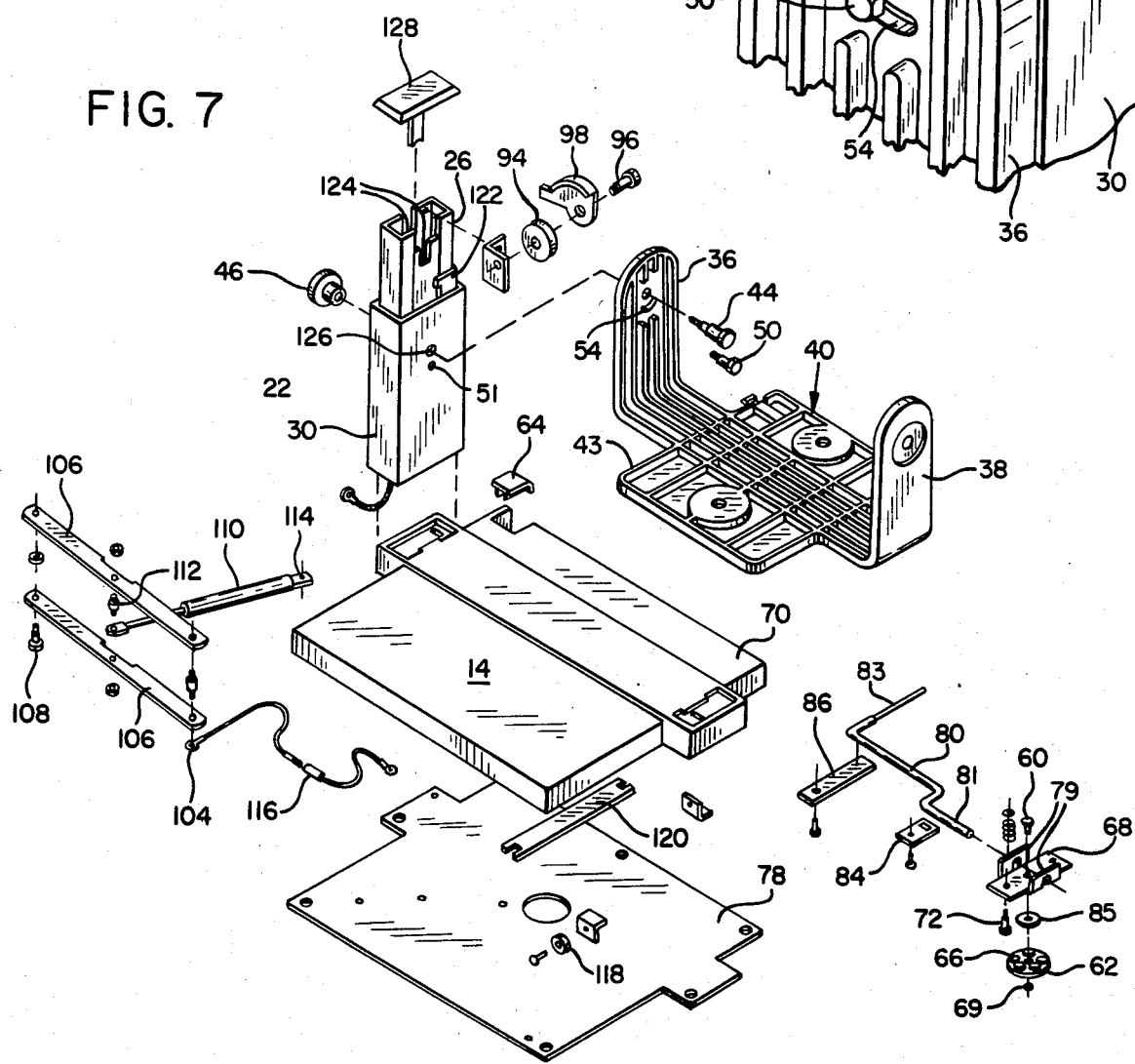

COMPUTER TERMINAL STAND

BACKGROUND OF INVENTION

The subject matter of the present invention relates generally to stands for supporting electronic instruments with light image displays and in particular to a cathode ray tube display device stand which enables tilting of the stand in a vertical direction, swiveling of the stand in a horizontal plane and adjustment of the height of the stand above a support surface and gliding movement over such support surface. The stand of the present invention is especially useful for supporting a computer display terminal to enable optimum ergonomic positioning of the terminal to a comfortable position for most users to prevent physical ailment problems such as headache, eye strain, sore neck, backache, vision glare and to avoid overextended distances for performing work tasks associated with the computer terminal.

Previously, it has been proposed by Nixdorf Computer AG of Paderborn, West Germany to provide a computer terminal stand with an adjustable height having a terminal support plate attached by a single post to a swivel base, such support plate tilting about a tilt axis at the top of the support post. However, unlike the present invention, the single support post does not telescope but instead pivots at the bottom end thereof about a pivot axis connected to the swivel base for adjusting the height of the computer terminal. This has the disadvantage that the height adjustment also causes movement of the computer terminal toward and away from the user with changes in elevation. In addition, the entire weight of the computer terminal is supported on the single support post so that it is difficult to adjust the height and is awkward to tilt the terminal on the support plate attached to the top of the support post. Unlike the present invention, the Nixdorf stand does not employ a pair of telescopic arms on opposite sides on the computer terminal and does not use a gas spring to counterbalance the weight of the terminal. Furthermore, there is no releasable brake which enables gliding movement of the base over the support surface when the brake is released and swivel movement of the base when the brake is engaged.

It has also been proposed by Florida Computer Graphics of Lake Mary, Fla. to provide a computer terminal stand for their Beacon model having a height adjustmet as well as swivel and tilt adjustments. However, unlike the present invention, it does not employ telescoping support posts or use a gas cylinder counterbalance means. In additionm there is no releasable brake to enable gliding movement of the swivel base, in the manner of the present invention.

Tandberg Data, A/S of Oslo, Norway provides a computer terminal stand for their Model TDV2200 terminal with a single telescoping support post to adjust elevation of the stand apparently by a gear means, but without using a gas spring counterbalance in the manner of the present invention. As a result, an elevation adjustment of only approximately 3.5 inches is achieved with the Tandberg stand as opposed to a height adjustment of 6.0 inches with the stand of the present invention. In addition, the tilt angle is limited to a range of approximately 25°, whereas a greater tilt angle range of 35° is achieved by the present invention. The swivel base of the Tandberg stand swivels through a maximum angle of 60°, while the present invention can swivel through a greater angle range of 360°. The stand of the invention is designed with the range of adjustment to meet the needs of the 5% to 95% of the user population. In addition, there is no releasable brake on the base of the Tandberg stand to enable gliding movement across the support surface when the brake is released in the manner of the present invention.

SUMMARY OF INVENTION

It is therefore one object of the present invention to provide an improved stand for supporting an electronic instrument with a light image display to enable tilting adjustment in a vertical direction, swivel adjustment in a horizontal plane and vertical height adjustment for more comfortable viewing of the display.

Another object of the invention is to provide such a stand for supporting a computer display terminal while enabling such tilting, swiveling and height adjustment in a simple and trouble-free manner to enable optimum ergonomic positioning of the terminal for comfortable viewing to prevent physical ailments to the operator.

A further object of the invention is to provide such a stand which may be more easily adjusted through a wider range of different height positions by means of a pair of telescoping support posts on the opposite sides of the stand.

An additional object of the invention is to provide such an improved stand in which the height adjustment is facilitated by employing a gas spring to counterbalance the weight of the computer terminal or other electronic instrument supported on the stand.

Still another object of the invention is to provide such a stand with a greater range of tilting adjustment by pivotally mounting a support carriage for the computer terminal or other instrument on adjustable tilt connections at the upper ends of the telescoping support posts.

A still further object of the invention is to provide such an improved stand in which a releasable brake means is employed to enable the swivel base to glide over its supporting surface in any direction when the brake is released and to enable such stand to swivel about a swivel axis on such base when the brake means is engaged.

DRAWINGS

Other objects and advantages of the present invention will be apparent from the following detailed description of a preferred embodiment of the invention and from the attached drawings of which:

FIG. 1 is a side elevation view of the stand of the present invention supporting a computer display terminal on a table top for use by a seated operator;

FIG. 2 is an enlarged front elevation view of the stand of FIG. 1 without the terminal mounted thereof;

FIG. 3 is an enlarged bottom elevation view taken along the line 3—3 of FIG. 2 with a portion of the bottom of the base broken away for clarity;

FIG. 4 is an enlarged partial vertical section view taken along the line 4—4 of FIG. 2 with parts broken away for clarity;

FIG. 5 is an enlarged partial vertical section view taken along the line 5—5 of FIG. 2;

FIG. 6 is an enlarged vertical section view taken along the line 6—6 of FIG. 3; and FIG. 7 is an exploded partial elevation view of the stand of FIGS. 1 to 6.

DESCRIPTION OF PREFERRED EMBODIMENT

As shown in FIGS. 1 and 2, the stand 10 of the present invention is preferably used to support a computer display terminal 12, but may also be used to support other electronic instruments having light displays including those produced by a cathode ray tube, such as a cathode ray oscilloscope. The stand 10 includes a base 14 which rests on any suitable support surface 16, such as the top of a desk or table. The stand is adjusted for comfortable viewing by a computer terminal operator 18 seated at such desk while he is operating the computer keyboard 20. The stand includes a pair of telescoping support posts 22 and 24 on opposite sides of the terminal 12, each consisting of an inner post member 26 or 28 and an outer post member 30 or 32 which slide relative to one another in the vertical direction indicated by arrows 34 to provide a maximum height adjustment of approximately 6.0 inches. The lower ends of the inner post members 26 and 28 are fixed to the base 14 so that such inner members do not move. The outer post members 30 and 32 slide along the inner post members and are secured at the upper ends of such outer post members to arm portions 36 and 38 of a U-shaped carriage 40 to which the computer display terminal is fastened by thumb screws extending through holes 42 in a support plate portion 43 of such carriage.

The arms 36 and 38 of the carriage 40 are fastened by two tilt shaft bolts 44 extending through the upper ends of the outer post members 30 and 32 and threadedly secured to tilt knobs 46 which are used to tighten the tilt shaft bolts and hold the carriage 40 in a selected tilt position. Thus, the carriage 40 is pivoted about a tilt axis 48 aligned with the tilt shaft bolts 44 and the tilt knob 46 through a limited range of tilting movement which is limited by two tilt stop screws 50 extending through support arms 36 and 38 and threaded into holes 51 in the outer post members 30 and 32, shown in FIGS. 5 and 7. The maximum tilt range of the stand carriage 40 about the tilt axis 48 is 35° between the limits of −10° backward and +25° forward, respectively, away from and toward the operator 18 in the direction of arrows 52. The limits of tilt are set by the tilt stop screw 50 and the length of an arcuate stop slot 54 provided in each of the support arms 36 and 38 so that the opposite ends of such slot engage the stop screw to limit tilting to −10° and +25°. The stop screw 50 extends through the arcuate stop slot 54 and is threaded into the upper end of the outer support posts 30 and 32.

The base 14 swivels in a horizontal plane about a vertical swivel axis 56 in the direction of arrows 58 through a maximum angle of 360° about a pivot pin 60 attaching the base to a brake pod 62 provided beneath such base as shown in FIG. 3. The brake is normally biased downward into engagement with the support surface 16 and is disengaged by depressing a brake button 64 provided on the top of the base.

As shown in FIGS. 3 and 6 the replaceable brake pad 62 includes five brake elements 66 which may be formed by sleeves of polyurethane or other elastomer material having a high coefficient of friction. The sleeves 66 extend through five holes in a metal disk brake pad equally spaced about a pivot pin 60 which secures the brake pad to a brake plate 68 by a retainer ring 69. The brake plate 68 is secured to the base housing 70 by a pair of bolts 72. The brake plate 68 is spaced from the base housing 70 by coil springs 74 surrounding bolts 72 which normally bias the brake plate downward but permit adjustment of the base plate up and down in the direction of arrows 76 relative to a base bottom plate 78 secured to the base housing in order to engage and disengage the brake from the support surface 16 on which the stand is mounted.

The brake is disengaged by depressing the brake button 64 which rotates a brake crank arm 80 extending through holes in a pair of flanges 79 on the brake plate 68, about an axis 82 to raise the brake plate 68 and brake pad 62 until the brake elements 66 disengage from the support surface 16. Thus, the crank arm 80 is secured by a pair of clamps 84 to the base housing 70 so that such crank arm pivots about axis 82 to raise the inner end 81 of the arm when an outer end 83 of such arm is pushed down by the brake button. It should be noted that the brake pad 62 is spaced from the brake plate 68 by a spacer washer 85 which may be made of brass to enable swivel movement of the base 14 including housing 70 and brake plate 68 relative to the brake pad 62 on the pivot pin 60 about the swivel axis 56 through a maximum angle of 360°. A leaf spring 86 is supported on the base housing 70 in engagement with the outer end 83 of the crank arm 80 to normally bias such outer end of the crank arm upward in a direction which causes the brake pad to be pushed down into engagement with the support surface 16. The brake button 64 when pushed downward overcomes the bias of leaf spring 86 and coil springs 74 thereby raising the brake pad 66 to release the brake. This disengagement of the brake enables the stand to be moved on a plurality of glide feet 88 in any direction over the support surface.

The glide feet 88 may be fixed annular feet or rollers made of ultrahigh molecular weight polyethylene plastic mounted by a lock washer in hollow projections on the lower surface of the housing 70 so that such feet extend through openings in the bottom plate 78 of the base. Five glide feet 88 may be provided on the base at two positions beneath each of the inner post members 26 and 28 and at a position adjacent the midpoint of the front edge of the base 14 as well as at two positions at the rear corners of the back edge of such base member for maximum stability and ease of gliding movement.

The height adjustment 34 of the carriage 40 is accomplished by raising and lowering the outer post members 30 and 32 of the telescoping support posts 22 and 24. As shown in FIG. 4, each of the upper post members 30 and 32 is attached to one end of a different one of two flexible coupling elements, such as steel cables 90, by means of fastening bolts 92. The fastening bolt passes through an eye fastener at the end of the cable and is screwed into a hole in the outer post member 30 adjacent the bottom end thereof. Each cable extends up around a first pulley 94 pivotally secured by a pulley shaft 96 to the top end of inner post members 26 and 28. A pulley cover member 98 is provided over the top of the pulley to prevent the cable from slipping off of the grooved surface of the pulley. The cables each extend downward from the first pulley and over a second pulley 100 secured to the bottom end of the inner post members 26 and 28. The cables then continue from the second pulley around a third pulley 102 attached to the base housing 70 adjacent the support post 24. The other ends of the two cables are connected by a fastener 104 to a pair of parallel pivot arms 106 which are pivotally mounted for rotation in the direction of arrows 107 about a pivot shaft 108 attached to the base housing 70.

A sealed compressed gas cylinder 110 is connected at the outer end of its piston rod to the middle of the pivot arms 106 by a pivot connection 112, and the opposite end of such cylinder is connected to the base housing 70 by a pivot connection 114. The gas cylinder 110 resists rotation of the pivot arm 106 by internal gas pressure on both sides of its piston. Such cylinder serves as a counterbalancing means to maintain the telescoping posts 22 and 24 in the position set by the operator by counterbalancing the weight of the computer display terminal mounted on the carriage 40 attached to such posts. Thus, the gas cylinder 110 operates as a "gas spring" whose internal gas pressure urges its piston rod outward to prevent the pivot arm 106 from being rotated in a clockwise direction in FIG. 3 by the weight of the computer terminal which tends to pull the cables attached to the pivot arm at end 104. The gas spring cylinder 110 is an inert gas filled cylinder which is hermetically sealed so that gas is provided on both sides of the piston in such cylinder. A small gas passage is provided through such piston to enable movement of the piston. One suitable air spring cylinder made at Atwood of Rockford, Ill. has a force of between 90 pounds and 116 pounds resisting extension and compression of its piston rod which has a maximum stroke of 3.15 inches.

The length of at least one of the cables 90 can be adjusted by a turnbuckle 116 secured to the cable which extends throuh the inner post member 26. This adjustable cable passes around a fourth pulley 118 positioned between the second pulley 100 and the third pulley 102 for such cable. A guide member 120 is secured to the base housing 70 and extends between the two parallel pivot arms 106 moved by the cables to guide the movement of such pivot arms in a predetermined horizontal plane as shown in FIGS. 3 and 7.

A plastic bearing member 122 is provided on the opposite side surfaces of each of the inner post members 26 and 28 to provide bearing surfaces against which the outer post members 30 and 32 slide during telescoping adjustment of the support posts. The plastic material of the bearing members 122 may be a hard low friction plastic, such as a plastic consisting of 20 percent Teflon, 5 percent silicone and the balance acetal resin. The inner post member and the outer post member are both made of metal such as extruded aluminum, and the base housing 70 and the carriage 40 including support arms 36 and 38 are made of plastic, such as a polycarbonate structural foam plastic.

As a result of the combined tilting movement on arms 36 and 38 about axis 48, swivel movement of base 14 about axis 56 and height adjustment in the direction of arrows 34 of the telescoping posts 22 and 24, the carriage 40 of the support stand 10 of the present invention provides optimum erogonomic positioning of the computer display terminal for comfortable viewing and use by the operator. This ergonomic positioning prevents vision glare, eye strain and the resulting headaches as well as preventing a sore neck and backaches. It also prevents overextended task distances for the operator as he operates the controls on the computer display terminal.

An exploded view of the stand of the present invention is shown in FIG. 7 for a clearer understanding. However, it should be noted that only one support post 22 is shown. Furthermore, while the inner post member 26 is shown positioned above the outer post member 30 in this view, such would not be the case after assembly. Also, the tilt shaft bolt 44 actually extends through notches 124 in the top end of the inner post member 26 for engagement by tilt knob 46 on the outside of the outer post member 30 in alignment with tilt shaft openings 126 in such outer post member. Finally, a cap 128 of a suitable plastic material is provided over the top end of the outer post member 30 to close such end.

It will be obvious to those having ordinary skill in the art that many changes may be made in the above described preferred embodiment of the present invention, without departing from the spirit of the invention. Therefore, the scope of the present invention should be determined by the following claims.

We claim:

1. A stand for an electronic instrument having a light display, comprising:
   a base member for supporting the stand, including swivel means to enable said stand to swivel in a substantially horizontal plane;
   telescoping post means attached to said base member including an inner post member and an outer post member which slide relative to each other to enable height adjustment of the post means;
   a support carriage for supporting the instrument thereon;
   a tilt connector means for pivotally attaching said support carriage to said telescoping post means to enable said carriage to tilt in a substantially vertical direction; and
   cylinder means attached to said base member for maintaining the post means in an adjusted height position after movement of the carriage on said post means to different height positions.

2. A stand in accordance with claim 1 in which the post means includes a pair of telescoping posts attached to the support carriage on opposite sides of the instrument.

3. A stand in accordance with claim 1 in which the cylinder means is a sealed gas cylinder means connected to the post members by flexible connector means, said sealed gas cylinder means including a piston rod.

4. A stand in accordance with claim 3 in which the flexible connectors are metal cables attached at one end to the piston rod of the gas cylinder by means of a pivot arm.

5. A stand in accordance with claim 4 in which the piston rod of the gas cylinder is pivotally connected to the middle of the pivot arm having a free end attached to said one end of said cables and having a fixed end pivotally attached to the base member.

6. A stand in accordance with claim 1 which includes glide means attached to said base member for enabling gliding movement of said base member in any direction over the surface on which the stand is supported, and releasable brake means which is normally biased to engage a support surface on which the stand is supported to prevent said gliding movement except when said brake means is released.

7. A stand in accordance with claim 6 in which the brake means engages the support surface at a position under a swivel axis of the base member so that said stand can swivel about said swivel axis when the brake means is engaged.

8. A stand for a computer display terminal, comprising:
   a base member for supporting the stand, including swivel means to enable said stand to swivel in a substantially horizontal plane;
   a pair of telescoping posts attached to said base member in spaced relationship so that said computer terminal can be supported between said posts, each of said posts including an inner post member and an outer post member which slide relative to each other to enable height adjustment of the posts;

a support carriage for supporting the computer terminal thereon;

tilt connector means for pivotally attaching said support carriage to each of said pair of telescoping posts to enable said carriage to tilt in a substantialy vertical direction; and gas cylinder means connected to the telescoping posts for maintaining the posts in an adjusted height position after movement of the carriage on said posts into a different height position, said gas cylinder means being attached to said base member.

9. A stand in accordance with claim 8 in which the gas cylinder means is connected to the posts by flexible connectors.

10. A stand in accordance with claim 9 in which the gas cylinder means includes a piston rod and the flexible connectors are metal cables attached at one end to the piston rod of the gas cylinder means.

11. A stand in accordance with claim 10 in which the piston rod of the gas cylinder means is pivotally connected to the middle of the pivot arm having a free end attached to said one end of said cables and having a fixed end pivotally attached to the base member.

12. A stand in accordance with claim 10 in which the other end of each cable is fixed to the outer post member of one of the posts and passes over a pulley attached adjacent the top of the inner post member which is fixed to the base member so that the outer post member slides along said inner post member to enable height adjustment of the post.

13. A stand in accordance with claim 8 in which the support carriage has a pair of support arms which are pivotally connected by a pair of tilt shafts to the top of the outer post members of said pair of posts.

14. A stand for a computer display terminal comprising:

a base member for supporting the stand, including swivel means to enable said stand to swivel in a substantially horizontal plane;

a pair of telescoping posts attached to said base member in spaced relationship so that said computer terminal can be supported between said posts, each of said posts including an inner post member and an outer post member which slide relative to each other to enable height adjustment of the posts;

a support carriage for supporting the computer terminal thereon;

tilt connector means for pivotally attaching said support carriage to each of said pair of telescoping posts to enable said carriage to tilt in a substantially vertical direction; and glide means attached to said base member for enabling gliding movement of said base member in any direction over the surface on which the stand is supported, and releasable brake means which is normally biased to engages a support surface on which the stand is supported to prevent said gliding movement except when said brake means is released, said brake means including a brake pad having a plurality of high friction brake elements of elastomer material fixed thereto, spring means for normally biasing said brake pad downward so that said brake elements engage the surface of said table, and release means for moving said brake pad upward against said spring means to release said brake.

15. A stand in accordance with claim 14 in which the brake means engages the support surface at a position under the swivel axis of the base member so that said stand can swivel about said swivel axis when the brake means is engaged.

16. A stand in accordance with claim 14 in which the release means includes a cam means for moving said brake upward operated by pivotal movement of a brake rod.

17. A stand in accordance with claim 16 in which the cam means is formed by a crank portion of said brake rod.

18. A stand in accordance with claim 13 in which a pair of tilt knobs are threaded on the outer ends of said tilt shafts to clamp the carriage in a selected tilt position and stop means are provided on the support arm to limit the maximum range of tilting movement.

* * * * *